Jan. 12, 1971  K. U. T. ALFREDSSON  3,553,823
METHOD FOR CONSTRUCTING LIGHT-METAL FRAMEWORKS
FOR TRANSPORT CONTAINERS, AND A FRAMEWORK
CONSTRUCTED ACCORDING TO THE METHOD
Filed Nov. 15, 1967

United States Patent Office 3,553,823
Patented Jan. 12, 1971

3,553,823
METHOD FOR CONSTRUCTING LIGHT-METAL FRAMEWORKS FOR TRANSPORT CONTAINERS, AND A FRAMEWORK CONSTRUCTED ACCORDING TO THE METHOD
Karl Uno Torsten Alfredsson, Skultuna, Sweden, assignor to Aktiebolaget Svenska Metallverken, Vasteras, Sweden
Filed Nov. 15, 1967, Ser. No. 683,333
Claims priority, application Sweden, Nov. 21, 1966, 15,918/66
Int. Cl. B23k 31/02
U.S. Cl. 29—471.1                                        6 Claims

ABSTRACT OF THE DISCLOSURE

A method wherein the light-metal framework of a transport container is assembled with the assistance of corner pieces. The corner pieces are formed by assembling and welding together extruded light-metal shapes in the form of box-like structures; the resulting box-like corner pieces then being welded to the adjacent ends of the structural bars of the framework.

BACKGROUND

The present invention is related to a method for constructing light-metal frameworks for transport containers, wherein the ends of the structural bars meeting at the corners of the framework are joined together by means of box-like corner pieces provided with holes for receiving coupling devices such as, crane hooks and the like.

Prior art containers of this type have been constructed of steel bars, joined to hollow, box-shaped corner pieces. However, because of their weight and their high tendency towards corrosion, frameworks of this nature have not proved to be satisfactory. Consequently, it has recently been suggested that the frameworks be constructed of light-metal extruded or section bars, for instance of aluminium or alloys thereof. In this instance the box-like corner pieces have been molded in one piece and welded to the ends of the bars meeting at the corners of the framework. However, corner pieces of this type have also proved to be unsatisfactory since not only is it a laborious and difficult task to remove the grains of sand therefrom after molding, these structures do not present the required degree of strength. This is particularly true of the corner pieces fitted in the bottom corners of the framework, which are not only subjected to special stresses when the container is lifted but are also subjected to very high impact stresses when handling the container.

As an alternative it has also been suggested that the corner pieces be made of steel and the remainder of the structure be of light-metal. However, this alternative excludes the possibility of welding the corner pieces to the structural bars, and, therefore, riveting or similar processes must be used instead.

A method of construction which conceivably would be more suitable is one wherein light-metal extruded bars are welded to corner boxes cast in light-metal. However, it has been found that the weld produced when welding extruded, structural bars to corner pieces cast in light-metal is weaker than the actual cast material from which the corner pieces are made.

Accordingly, the object of the invention is to obviate these disadvantages manifest in the construction of containers having an all light-metal framework.

In accordance herewith the invention is mainly characterized corner pieces being constructed of extruded light-metal shapes, which are assembled and welded together to form said corner pieces, which in turn are welded to the structural bars.

DETAILED DESCRIPTION

Figure 1:
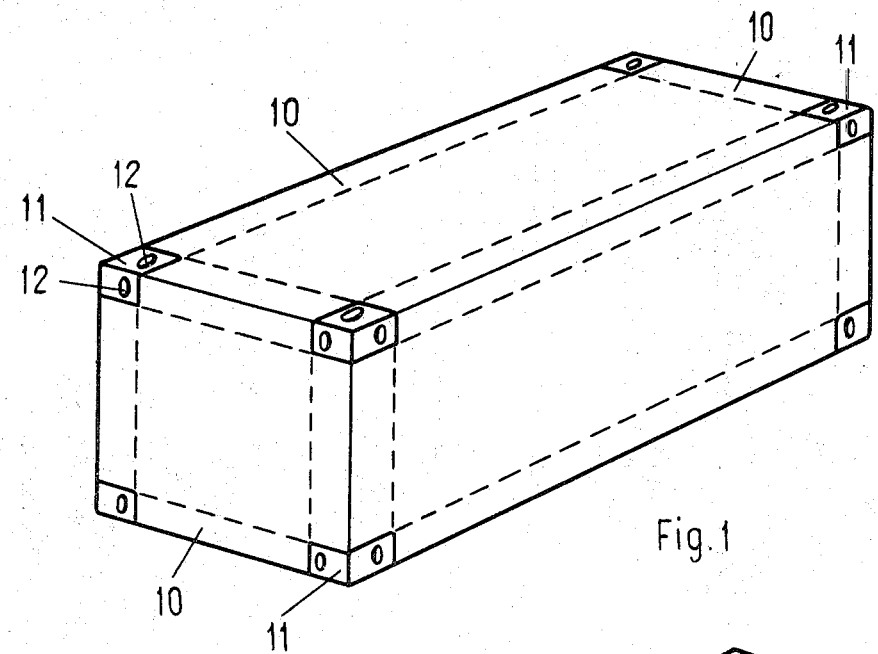
FIG. 1 is a perspective view of a transport container, wherein the edges of the container are formed of extruded, lightweight structural bars.

The container shown in FIG. 1 includes stuctural bars 10 at all its edges. The bars 10 meet at the corners of the container and are there welded to box-type corner members 11. As can be seen from FIG. 1 the corner members are provided with holes 12 which are intended to receive coupling means, such as crane hooks or the like. The holes may also be used to connect together adjacently situated containers, to form self-supporting units.

Figure 2:
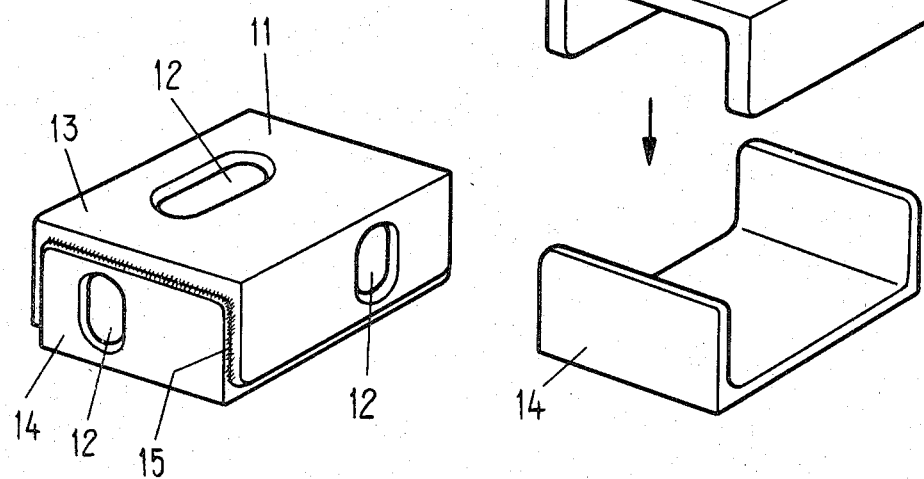
FIG. 2 is a perspective view of a corner piece according to the invention, on enlarged scale.

FIG. 2 shows a corner member 11 on enlarged scale; the construction of the corner member and the holes disposed therein being fully evident therefrom.

In the illustrated embodiment, the corner member 12 is constructed from two U-shaped extruded, lightweight members or segments 13, 14, fitted one over the other.

Figure 3:
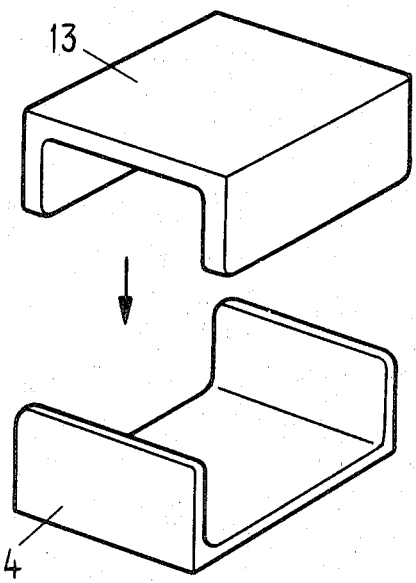
FIG. 3 illustrates the method of constructing a corner piece according to FIG. 2 from U-shaped extruded members.

The method in which the corner member 12 shown in FIG. 2 is constructed can be clearly seen in FIG. 3. The U-shaped members 13, 14 are displaced 90° relative to one another and are weldled along contiguous edges to form a compact unit. The weld is indicated in FIG. 2 by reference numeral 15. The holes 12 can be made in the extruded members either before they are welded together or afterwards. Further, it is possible according to the invention to strengthen the extruded members by providing the same with strengthening means or strengthened zones in the form of ridges, flanges, beads or the like. It is also possible to provide strengthening means in the form of metal bars or inserts made of a more rigid material than the lightweight metal of members 13, 14, such as steel, and these bars or inserts are placed in the regions of the corner pieces subjected to particular loads. For instance, shaped grooves, such as dove-tail grooves, may be arranged to extend longitudinally of the extruded member, to receive corresponding strengthening or wear bars.

According to one modification of the invention the corner members may be tubular, square, etc., and square cover plates are inserted on the ends thereof and welded to the section to form a box-like corner member. According to the invention the cover plates should also be made of an extruded, lightweight metal.

The invention is not restricted to the described and illustrated embodiment but can be varied within the scope of the following claims.

I claim:

1. A method for the construction of a lightweight frame for a transport container in which structural bars of the frame are joined together by box-like corner members provided with holes for receiving coupling means, said structural bars and box-like corner members being constituted of similar lightweight material, said method comprising extruding a structural member into a predetermined shape, dividing said structural member into segments of predetermined length each segment having open ends, joining a plurality of said segments thereby closing said open ends to form a corner box structure and joining the corner box structure to said bars to form a rigid frame.

2. A method as claimed in claim 1, wherein said ends are closed by interfitting two of said segments together.

3. A method as claimed in claim 2 wherein said segments are of U-shape, are interfitted at right angles to one another, and are welded together.

4. A method as claimed in claim 1, wherein said bars are welded to the corner box structures.

5. A method as claimed in claim 1, wherein said extruded members are of lightweight metal.

6. A method for the construction of a lightweight frame for a transport container in which structural bars of the frame are joined together by box-like corner members provided with holes for receiving coupling means, said structural bars and box-like corner members being constituted of similar lightweight material, said method comprising dividing extruded structural members into segments of predetermined length each segment having open ends, closing said open ends to form a corner box structure and joining the corner box structure to said bars to form a rigid frame, said segments being of U-shape and interfitted at right angles to one another.

References Cited

UNITED STATES PATENTS

| | | | |
|---|---|---|---|
| 1,407,595 | 2/1922 | Smith | 220—1.5 |
| 2,149,640 | 3/1939 | Tegarty | 29—471.1 |
| 2,194,349 | 3/1940 | Almdale | 29—471.1 |
| 3,061,134 | 10/1962 | Feshmire | 220—1.5 |
| 3,221,921 | 12/1965 | Silverman | 220—1.5 |
| 3,427,699 | 2/1969 | Cape | 29—471.1 |
| 3,404,444 | 10/1968 | Isbrandtsen | 29—150 |

JOHN F. CAMPBELL, Primary Examiner

R. B. LAZARUS, Assistant Examiner

U.S. Cl. X.R.

29—463, 482; 220—1.5